United States Patent
Kubo et al.

[11] Patent Number: 5,693,705
[45] Date of Patent: Dec. 2, 1997

[54] MATTED ELECTRODEPOSITION COATING COMPOSITION AND A METHOD OF PRODUCING A MATTED ELECTRODEPOSITION COATING

[75] Inventors: Akira Kubo; Shinichi Inoue; Shunji Ishii, all of Hyogo-ken, Japan

[73] Assignee: Shinto Paint Co., Ltd., Hyogo-ken, Japan

[21] Appl. No.: 581,525

[22] PCT Filed: May 29, 1995

[86] PCT No.: PCT/JP95/01021

§ 371 Date: Jan. 17, 1996

§ 102(e) Date: Jan. 17, 1996

[87] PCT Pub. No.: WO95/33795

PCT Pub. Date: Dec. 14, 1995

[30] Foreign Application Priority Data

Jun. 2, 1994 [JP] Japan ................... 6-145319

[51] Int. Cl.$^6$ ................................ C08L 61/00
[52] U.S. Cl. .................. 524/512; 205/80; 205/109; 205/147; 205/224; 524/501
[58] Field of Search ................... 524/512, 201; 205/80, 109, 147, 224

[56] References Cited

U.S. PATENT DOCUMENTS 5,200,461  4/1993  Tsuchiya et al. ............ 524/512 X

FOREIGN PATENT DOCUMENTS 0492847  1/1992  European Pat. Off. .

*Primary Examiner*—Judy M. Reddick
*Attorney, Agent, or Firm*—Wenderoth, Lind & Ponack

[57] ABSTRACT

This invention offers a method of manufacturing a matted electrodeposition coating composition which does not mask the hue and the fine pattern which are inherent to the thing to be coated and also offers a method of conducting such an electrodeposition. The invention also relates to a matted electrodeposition coating composition which is characterized in containing (A) an anionic acryl resin having an acetoacetyl group in a side chain, (B) an amine and water, (C) an aldehyde and (D) an alkoxylated methylolmelamine resin with a water dilutability of not more than 4.0 cc and optionally containing (D) an acidic composition with pKa of not more than 1.9 as well as a method of producing a matted electrodeposition coating using the aforementioned composition.

4 Claims, No Drawings

MATTED ELECTRODEPOSITION COATING COMPOSITION AND A METHOD OF PRODUCING A MATTED ELECTRODEPOSITION COATING

TECHNICAL FIELD

The present invention relates to a formulation of a matted electrodeposition coating composition and a method of coating the same and, particulary, it relates to a formulation of a colorless and transparent matted electrodeposition coating composition having resistances to chemicals and to weather and also to a method of coating the same. More particularly, it relates to a formulation of a matted electrodeposition coating composition having resistances to chemicals and to weather wherein a pattern of the design due to fine unevenness and the hue inherent to the thing to be coated are not hidden but only the gloss on the external appearance are lowered.

PRIOR ART

Common matted coating compositions which do not hide the fine pattern and the hue inherent to the thing to be coated are those in which microsilica is dispersed in the coating composition. However, microsilica has a disadvantage that it is inferior in terms of a resistance to chemicals, especially to alkali, does not give a film having a good transparency and affords a deposition of the microsilica onto the thing to be coated in the case of the thing which needs complicated coating operations whereby a difference in luster is resulted depending upon the area to be coated, especially on the upper and lower surfaces. In the meanwhile, a method of dispersing fine particles of organic substances having small specific gravity in a coating composition has been known. For example, a product in which organic fine particles are dispersed in a coating composition as mentioned in Japanese Patent Kokoku No. 8975/76 is practical as a spray coating composition of a common solvent type and a coating composition of a dipping type although it is not suitable as an electrodeposition coating composition. The reason is that the electrophoreticity of said organic fine particles is not taken into consideration at all and accordingly that there is no property of migration in a constant rate when electricity is applied whereby they are detached when rinsed with water. Further, in electrodeposition coating compositions and in coating the same, viscosity of the electrodeposition bath is nearly the same as that of water in view of diffusion of generated Joule's heat and washability with water while, in the case of the organic fine particles mentioned in the above-mentioned patent, there is a disadvantage that the homogeneous dispersibility of said particles in a bath of an electrolyte of such a low viscosity (usually containing 80–95% of water) is poor and further that no consideration is made on exclusion of the solvent which is a cause of lowering the throwing power and of lowering the resistane of a coated film in the electrodeposition coating composition and also on exclusion of the electrolyte other than the essential components for the coating composition.

In order to overcome such disadvantages, an improvement as mentioned in the Japanese Patent Kokai No. 141771/86 was proposed by the present inventors. Said patent has the following advantages.

(1) Changes in gloss upon changes in electrodeposition coating conditions, temperature of the liquid, stirring, voltage, time for applying electricity, polar ratio, etc. are little;

(2) It is easy to make the said synthetic fine particles finer and, due to an ionic action, dispersibility in water is stabilized;

(3) Purification of said synthetic fine particles is easy, invalid current upon the electrodeposition can be prevented and no oleophilic solvent is contained whereupon good throwing power can be maintained; and (4) The fine particles exhibit a fluidity and are firmly present in a coated film whereupon they are not affected by washing with water.

PROBLEMS TO BE SOLVED BY THE INVENTION

Although the matted coated film prepared as such is very uniform and has a broad operation range in each of steps of electrodeposition, washing with water and baking, there is a tendency that, when the gloss is 20% or less (60°-mirror reflectivity), hue and pattern of the metal undercoat are hidden. Especially when the undercoat has a hue near black color, such a tendency is significant whereupon the so-called metallic feel is lost and it is sometimes judged that the external appearance is no good.

With respect to a method for preparing a matted electrodeposition coating having a metallic feel, a method of using the microgel utilizing alkoxysilane groups as a matting means is described in the Japanese Patent Kokai Nos. 67396/84, 14281/89 and 263296/93 although they have a restriction in terms of electrodeposition coating operation such as that gloss varies depending upon the coating conditions and that affection by the washing step after the electrodeposition is often resulted.

MEANS TO SOLVE THE PROBLEMS

According to the present invention, the above-mentioned problems have been found to be solved when an anionic acryl resin containing acetoacetyl group in a side chain is neutralized/diluted/dispersed with an amine and water followed by adding an aldehyde thereto to form fine gel particles which can be electrodeposited in water, said particles being then compounded with an alkoxylated methylolmelamine having a water dilutability of not more than 4.0 cc as a curing agent and further compounded with an acidic compound with a pKa of not more than 1.9 as a catalyst for lowering the curing temperature.

Thus, the present invention provides a matted electrodeposition coating composition which is characterized in containing (A) an artionic acryl resin having an acetoacetyl group in a side chain, (B) an amine and water, (C) an aldehyde and (D) an alkoxylated methylolmelamine resin with a water dilutability of not more than 4.0 cc and optionally containing (D) an acidic composition with pKa of not more than 1.9 as well as a method of producing a matted electrodeposition coating using the above composition.

The matted electrodeposition coating composition of the present invention and a method of coating the same will be further illustrated as hereunder.

(A) The anionic acryl resin having an acetoacetyl group in a side chain is prepared either:

(1) by a method in which (a) an $\alpha,\beta$-ethylenic unsaturated monomer having an acetoacetyl group, (b) an $\alpha,\beta$-ethylenic unsaturated monomer having an acidic group and (c) a monomer which is polymerizable therewith are polmerized; or (2) by a method in which (a) $\alpha,\beta$-ethylenic unsaturated monomer having an acidic group, (b) $\alpha,\beta$-ethylenic unsaturated monomer having a hydroxyl group and (c) a monomer which is polyerizable therewith are previously polymerized and then (d) an acetoacetylation is carried out with diketene or with acetoacetyl ester utilizing the hydroxyl groups in said polymer.

The acidic group of the acryl resin prepared by such a means is neutralized/diluted/dispersed with the amine and water and, after that, the aldehyde is added thereto whereupon, as a result of a condensation reaction of with said introduced acetoacetyl group, fine gel particles which can be electrodeposited in water are manufactured.

More detailed explanation will be given as hereunder.

(A)(1)(a). Representative example of the α,β-ethylenic unsaturated monomer having an acetoacetyl group is acetoacetoxyethyl methacrylate represented by the following formula [1].

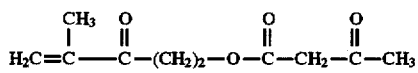

Besides the above, acetoacetoxyethyl acrylate, acetoacetoxypropyl (meth)acrylate, acetoacetoxybutyl (meth) acrylate, etc. are useful and derivatives prepared by a modification of hydroxyethyl (meth)acrylate with a lactone followed by acetoacetylation may be utilized as well.

The suitable amount of the acetoacetyl group in 100 of the whole monomers is 5–100 mmoles. When it is less than 5 mmoles, numbers of the fine gel particles necessary for matting is insufficient while, when it is more than 100 mmoles, evenness of the resulting coated film is insufficient.

(A)(1)(b). Common examples of the α,β-ethylenic unsaturated monomer having an acidic group are methacrylic acid and acrylic acid. Maleic acid, maleic acid anhydride, fumaric acid, itaconic acid, etc. may be used as well. Further examples which are applicable are the monomers having an acidic group other than a carboxyl group such as acrylamide tert-butylsulfanic acid represented by the following formula [2]

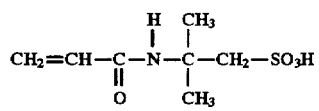

and mono(2-acryloyloxyethyl)acid phosphate represened by the following formula [3].

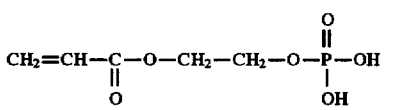

Those monomers having acidic groups may be used either solely or jointly if necessary although it is necessary that an acid value of 10–200 (mg KOH/g solid in the resin) is achieved.

When it is less than 10 (mg KOH/g resin solid), stability of the dispersion in water after neutralization with the amine is insufficient while, when it is more than 200 (mg KOH/g resin solid), the electrophoreticity is poor and, in addition, the property such as alkali resistance is deteriorated.

(A)(1)(c) is a monomer which is polymerizable with the above-mentioned (a) and (b) and its examples are as follows. Although those α,β-ethylenic unsaturated monomers may be suitably selected depending upon the requested quality such as hardness, softness, weathering resistance, etc., it is advisable that the monomer having a hydroxyl group is used within a range of 30–230 (mg KOH/g resin solid) of a hydroxyl value as a functional group upon curing and condensation in a baking step. When the hydroxyl value is less than 30, sufficient crosslinking is not achieved while, when it is more than 230, water resistance is poor and a satisfactory film property is not achieved.

Examples of those α,β-ethylenic unsaturated monomers are aromatic vinyl monomers such as styrene and vinyltoluene; alkyl acrylates or methacrylates such as methyl acrylate, ethyl acrylate, butyl acrylate, hexyl acrylate, cyclohexyl acrylate, methyl methacrylate and ethyl methacrylate and derivatives thereof; amide compounds of acrylic acid or methacrylic acid and derivatives thereof; and acrylonitile, methacrylonitrile, etc. If necessary, polyfunctional monomers such as divinylbenzene and trimethylolpropane tri(meth)acrylate may be used as well.

Examples of the α,β-ethylenic unsaturated monomers containing a hydroxyl group are 2-hydroxyethyl acrylate, 2-hydroxyethyl methacrylate, 2-hydroxypropyl (meth) acrylate and 4-hydroxybutyl (meth)acrylate as well as modified products thereof with a lactone.

Suitable examples of the α,β-ethylenic unsaturated monomers having an acidic group as mentioned in (A)(2)(a) are the same as those exemplified in the above (1)(b). The same thing is applied to the acid value too.

Examples of the α,β-ethylenic unsaturated monomers having a hydroxyl group as mentioned in (A)(2)(b) are 2-hydroxyethyl (meth)acrylate, 2-hydroxypropyl (meth) acrylate and 4-hydroxybutyl (meth)acrylate as well as the products modified with a lactone as mentioned already.

With respect to the hydroxyl value, 30–230 (mg KOH/g resin solid) is suitable the same as before but the hydroxyl value which is consumed by an acetoacetylation is to be previously considered to be outside 30–230 (mg KOH/g resin solid).

(A)(2)(c) is a monomer which is polymerizable with the monomers of (2)(a) and (b) and its examples are the aromatic vinyl monomers, alkyl (meth)acrylates including derivatives thereof and (meth)acrylic acid amides incuding derivatives thereof. Polyfunctional monomers such as divinylbenzene and trimethylolpropane tri(meth)crylates may also be used if necessary.

Methods for polymerizing the above-mentioned monomers of (A)(1)(a), (b) and (c) and also of (A)(2)(a), (b) and (c) may be known methods such as solution polymerization, emulsion polymerization and suspension polymerization and, in the case of (A)(2), a solution polymerization is particularly preferred. The polyerization catalyst used therefor may be suitably selected from the known ones such as azo compounds (e.g. azobisisobutyronitrile) and peroxide compounds (e.g. benzoyl peroxide).

For keeping the good dispersibility of the resulting polymers in water, it is useful to add alcohols such as ethanol, propanol and butanol and glycol ethers such as ethylene glycol monobutyl ether and ethylene glycol dimethyl ether.

With respect to the solvent used for acetoacetylation of (A)(2), a solvent which is inert to the acetoacetylation should be selected.

The substance of (A)(2)(d) is a compound for conducting an acetoacetylation of the hydroxyl groups of the resin synthesized by (2)(a), (b) and (c) using diketene or acetoacetyl esters.

Examples of such a compound are methyl acetoacetate represented by the following formula [4]

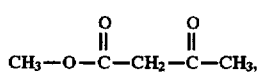

ethyl acetoacetate represented by the following formula [5]

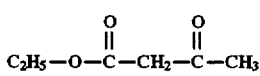

and tert-butyl acetoacetate represented by the following formula [6]

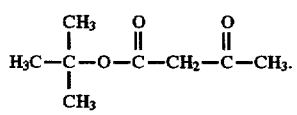

The resulting anionic acryl resin containing acetoacetyl groups in the side chain prepared as such may be subjected to the following neutralization and dilution with water after, if necessary, mixing with amino resin, xylene resin, epoxy resin, polyester resin, etc. depending upon the requested property, workability, cost, etc. Further, mixing with such a miscible resin may be utilized, if necessary, after the neutralization and dilution with water.

The amine (B) is to make the component (A) dispersible or soluble in water by neutralization and its examples are alkyl or alkanolamines such as monoethylamine, diethylamine, triethylamine, diethanolamine and diisopropanolamine. Other examples are cyclic amines such as pyridine and ammonia. In some cases, inorganic alkali such as KOH and NaOH may be used. Useful degree of neutralization is 0.3–1.5 equivalents to said carboxylic acid. When it is less than 0.3 equivalent, the dispersing in water is difficult while, when it is more than 1.5 equivalents, the electrophoreticity is poor and that is not preferred.

It is preferred that the water used here is a deionized water. The use of deionized water which is previously mixed with a predetermined amount of the above-mentioned amine is a useful means as well.

A method in which a resin solution is poured into an aqueous amine, a method in which a neutralized resin is poured into water, etc. may be suitably used too.

The higher the degree of neutralization with the amine or the higher the degree of dilution with a deionized water, the finer the particle size of the resulting gel particles. Anionic and nonionic surface-active agents may be added, if necessary, for controlling the particle size or for achieving a stable dispersion.

Then an explanation will be made for the aldehyde. The resin particles which aree dispersed in water by the components (A) and (B) are crosslinkingly condensed with the aldehyde which is the component (C) to produce fine gel particles. Examples of the useful aldehyde are formalin and formalin condensates such as paraform. Besides those, aliphatic aldehydes such as acetaldehyde, propionaldehyde and butyraldehyde, aromatic aldehydes such as benzaldehyde and aldehyde condensates such as glyoxal may be used as well. The aldehyde is recommended to add in an amount of 0.1–10 moles, preferably 0.2–2 moles, to one mole of the abovementioned acetoacetyl group.

Alkoxylated methylolmelamine resin (D) having a water dilutability of not more than 4.0 cc will be explained in detail. The water dilutability is measured as follows. The sample (5 g) and 5 g of isopropanol which are weighed by an even balance are mixed in a 100 ml beaker, water is dropped thereinto from a burette by keeping the temperature at 25° C. with stirring and the volume (milliliters) of water used for causing a turbidity is defined as the cc number of the water dilutability. The endpoint of dropping is a stage when the printed letters (No.4 type) under the beaker are no longer able to be read. The alkoxylated methylolmelamine with a low water dilutability can be manufactured by conventional methods and can be obtained by a higher alkoxylation or by making the degree of condensation higher. Thus, in an industry, melamine resin by mixing methanol and butanol is used for electrodeposition and can be manufactured by making the ratio of butanol higher. It can be manufactured by adjusting the degree of polymerization higher by the condensation of the melamine resin per se.

A crosslinking reaction takes place between the melamine resin and the hydroxyl groups of the above-mentioned component (A). In some cases, the resin with a water dilutability of more than 4 cc may be jointly used if necessary.

It is suitable to use 10–100 parts of the melamine resin with a water dilutability of not more than 4 cc to 100 parts by weight of the component (A). When it is less than 10 parts by weight, a sufficient crosslinkingly coated film is not obtained while, when it is more than 100 parts by weight, amount of the melanine resin is too much whereby a sufficient crosslinking coated film is not obtained as well and, further, washing ability after the electrodesposition with water is lowered in the electrodeposition operation.

The function of the alkoxylated methylolmelamine (D) with a water dilutability of not more than 4.0 cc is believed to be as follows.

When water for washing is not uniformly present on the surface of the electrodeposited coated film after washing with water in the course of the steps of electrodeposition-washing-baking, a speed of rising the temperature of the thing to be coated in the baking furnace is retarded and, in some cases, luster and external appearance of the final coated film after baking are no good since the etching effect of the area in which water is present is different from that in which no water is present. Especially in an industry, the water used for washing is a filtrate through UF membrane or RO membrane and contains water-soluble substances and amines and, therefore, the abovementioned inconvenience is apt to occur in an industry. Now, the melamine resin with a water dilutability of not more than 4.0 cc is not soluble in water but is water-repulsive and, accordingly, said resin is necessary for solving such an inconvenience. Such a function cannot be expected by a melamine resin with a water dilutability of more than 4 cc.

Then, an acidic compound (E) with pKa of not more than 1.9 will be explained as hereunder.

The acidic compound with pKa of not more than 1.9 is not always essential when a crosslinking between the alkoxylated methylol melamine (D) with a water dilutability of not more than 4.0 cc and the anionic acrylresin (A) containing an acetoacetyl group in the side chain is conducted at an industrially common baking temperature, i.e. at not higher than 180° C. However, because of a requirement for conservation of energy in recent years, there is a demand for achieving a good film property at the baking temperature of a low region (e.g. at 150° C.) and, in such a case, the acidic compound with a pKa of not more than 1.9 will be essential. At the baking temperature of such a low temperature region, an acidic compound with a pKa of more than 1.9 does not achieve a good property of the coated film. Its suitable amount to 100 parts by weight of (A) is 0.1–2 parts by weight. The acidic compound which is evaporated during the baking is not effective and the use of the sulfonic acid catalyst is most useful. Repretative examples are aromatic sulfonic acids such as p-toluenesulfonic acid. More specific examples are monosulfonic acid such as p-dodecylbenzenesulfonic acid and disulfonic acids such as dihexylnaphthalenedisulfonic acid. The use of such an acidic compound in a form of a salt by neutralizing with the amine or the use of it after esterifying with a low-molecular epoxy resin or a lower alcohol, i.e. the use of it in a so-called masked state, is meaningful too.

In preparing a fine gel from such a formulation of the present invention, it is necessary to age it under the following condition. Such a condition is to be suitably selected but the condition of stirring by common means at the temperature of 5°–100° C. for 5 minutes to 48 hours (preferably, at 20°–100° C. for 30 minutes to 3 hours) is advantagenous in an industrial scale.

The matted electrodeposition coating composition of the present invention containing the above-mentined components (A) to (D) and (E) may, if necessary, be diluted with deionized water or a solvent mainly comprising water and then a predetermined voltage is loaded using the thing to be coated as an anode to give an electrodeposition coated film. If necessary, it may be washed by common method. After that, it is subjected to a baking step to give a matted coated film.

EXAMPLES

The present invention will be further illustrated by the following examples.

Manufacturing Example of Anionic Acryl Resin (a-1) containing Acetoacetyl Groups in Side Chains.

A reaction apparatus equipped with stirring device, thermometer, device for dropping the monomers and reflux condenser was prepared.

| | | |
|---|---|---|
| (1) | Ethylene glycol monobutyl ether | 25.0 parts by weight |
| (2) | Isopropyl alcohol | 50.0 parts by weight |
| (3) | Ethylene glycol dimethacrylate | 0.2 part by weight |
| (4) | n-Butyl acrylate | 15.4 parts by weight |
| (5) | Methyl methacrylate | 25.6 parts by weight |
| (6) | Styrene | 30.0 parts by weight |
| (7) | 2-Hydroxyethyl acrylate | 20.0 parts by weight |
| (8) | Acetoacetoxyethyl methacrylate | 2.4 parts by weight |
| (9) | Acrylic acid | 6.4 parts by weight |
| (10) | Azobisisobutyronitrile | 1.0 part by weight |
| (11) | Azobisisobutyronitrile | 0.2 part by weight |

(1) and (2) were charged in the reaction apparatus, heated up to a refluxing temperature with stirring and (3)–(10) which were homogeneously mixed previously were dropped thereinto during three hours. The temperature was kept at 90°±3° C. After 1.5 hours since completion of the dropping, (11) was added thereto. The reaction was continued at 90°±3° C. for 1.5 hours followed by cooling.

Transparent and viscous resin solution with a resin solid content of 56.5% and an acid value of 52 mg KOH/g resin solid was obtained.

Manufacturing Example of Anionic Acryl Resin (a-2) containing Acetoacetyl Groups in Side Chains.

A reaction apparatus equipped with stirring device, thermometer, device for dropping the monomers and reflux condenser was prepared.

| | | |
|---|---|---|
| (1) | Diethylene glycol dimethyl ether | 75.0 parts by weight |
| (2) | Ethylene glycol dimethacrylate | 0.2 part by weight |
| (3) | n-Butyl acrylate | 15.4 parts by weight |
| (4) | Methyl methacrylate | 25.6 parts by weight |
| (5) | Styrene | 30.0 parts by weight |
| (6) | 2-Hydroxyethyl acrylate | 21.3 parts by weight |
| (7) | Acrylic acid | 6.4 parts by weight |
| (8) | Azobisisobutyronitrile | 1.0 part by weight |
| (9) | Azobisisobutyronitrile | 0.2 part by weight |
| (10) | tert-Butyl acetoacetate | 1.8 parts by weight |

(1) was charged in a reaction apparatus, the temperature was raised up to 90° C. with stirring and (2)–(8) which were homogeneously mixed previously were dropped thereinto during three hours. The temperature at that time was kept at 90°±3° C. After 1.5 hours since the completion of the dropping, (9) was added, the reaction was continued at 90°±3° C. for 1.5 hours, the temperature was raised to 135° C., (10) was added, the mixture was kept at 135°±3° C. for two hours, tert-butanol was evaporated therefrom and the residue was cooled.

A transparent and viscous resin solution with a resin solid content of 56.3% and an acid value of 50 mg KOH/g resin solid was obtained.

Manufacturing Example of Anionic Acryl Resin (a-3) containing no Acetoacetyl Group in Side Chains.

Resin was manufactured from the following formulation using the same apparatus and procedures as in the case of (a-1).

| | | |
|---|---|---|
| (1) | Ethylene glycol monobutyl ether | 25.0 parts by weight |
| (2) | Isopropyl alcohol | 50.0 parts by weight |
| (3) | Ethylene glycol dimethacrylate | 0.2 part by weight |
| (4) | n-Butyl acrylate | 15.4 parts by weight |
| (5) | Methyl methacrylate | 25.6 parts by weight |
| (6) | Styrene | 30.0 parts by weight |
| (7) | 2-Hydroxyethyl acrylate | 22.4 parts by weight |
| (8) | Acrylic acid | 6.4 parts by weight |
| (9) | Azobisisobutyronitrile | 1.0 part by weight |
| (10) | Azobisisobutyronitrile | 0.2 part by weight |

A transparent and viscous resin solution with a resin solid content of 56.6% and an acid value of 50 mg KOH/g resin solid was obtained.

Example 1. Manufacturing Example of Matted Electrodeposition Coating Liquid.

| | | |
|---|---|---|
| (1) | Resin solution of (a-1) | 176.2 parts by weight |
| (2) | Triethylamine | 7.2 parts by weight |
| (3) | Deionized water | 160.0 parts by weight |
| (4) | Alkoxylated methylolmelamine resin (Sumimal M-8B; manufactured by Sumitomo Chemical) | 30.0 parts by weight |
| (5) | Formalin (35% aq formaldehyde soln) | 0.4 part by weight |
| (6) | Deionized water | 300.0 parts by weight |
| (7) | Deionized water | 951.2 parts by weight |

Water dilutability of Sumimal M-8B used here was 2.6 cc.

(2), (3) and (4) were added to (1) of 30° C. with stirring, the mixture was stirred for one hour until it became homogeneous, (5) was added thereto and the mixture was raised up to 80° C., stirred for two hours more and cooled. Then (6) and (7) were added thereto to give an electrodeposition coating bath liquid.

A turbid electrodeposition coating bath liquid of 22° C. with a resin solid content of 8%, pH of 9.1 and a specific resistance of 185 Ω.cm was obtained.

(An Example of Electrodeposition Coating Process and Confirmation of Fine Gel Particles)

The resulting electrodeposition coating bath liquid was charged in a three-liter vessel made of polyvinyl chloride. SUS-304 was used as a cathode while the anode (the thing to be coated) was a plate of 6063 aluminum alloy which was anodically oxidized (thickness of the oxidized coat: 9 μm), electrolytically colored in black and rinsed with warm water by a usual manner. The bath temperature, the polar distance and the polar ratio (+/−) were made 22° C., 12 cm and 2/1, respectively and electricity was loaded at 170 volts to give 10 μ by a usual method. This was rinsed and baked and dried at 180° C. for 30 minutes.

The results are given in Table 1.

Examples 2–5.

| | | |
|---|---|---|
| (1) | Resin liquid of (a-1) | 176.2 parts by weight |
| (2) | Triethylamine | 7.2 parts by weight |
| (3) | Deionized water | 160.0 parts by weight |
| (4) | Alkoxylated methylolmelamine resin (Sumimal M-8B manufactured by Sumitomo Chemical) | 30.0 parts by weight |
| (5) | Formalin (35% aq formaldehyde soln) | 0.4 part by weight |
| (6) | Acidic compound (Catalyst 600 manufactured by Mitsui Cytech KK) | 0.5 part by weight |
| (7) | Deionized water | 299.5 parts by weight |
| (8) | Deionized water | 951.2 parts by weight |

The Catalyst 600 used here was an aromatic sulfonic acid with a pKa of <1.0.

(2), (3) and (4) were charged to (1) of 30° C. with stirring, the mixture was stirred for one hour until it became homogeneous, (5) was added thereto and the mixture was raised up to 80° C., stirred for two hours more and cooled. After that, (6), (7) and (8) were added to give an electrodeposition coating bath liquid.

A turbid electrodeposition coating bath liquid with a temperature of 22° C., a resin solid content of 8%, pH of 9.0 and a specific resistance of 1,800 Ω.cm was obtained.

Examples of electrodeposition coating process and confirmations of fine gel particles were conducted by the same manner as in Example 1 except that the baking and drying operations were conducted at 150° C. for 30 minutes.

Comparative Examples 1–6.

Using the formulations as shown in Table 2, the electrodeposition coating bath liquids containing 8% of solid were prepared by the same manner as in Example 1 followed by electrodeposition and baking.

The results are given in Table 2.

TABLE 1

|  | Examples | | | | | |
|---|---|---|---|---|---|---|
|  | 1 | 2 | 3 | 4 | 5 | 6 |
| Formulation (parts by weight) | | | | | | |
| (A) Anionic Acryl Resin | | | | | | |
| (a-1) | 176.2 |  | 176.2 | 176.2 | 176.2 | 176.2 |
| (a-2) |  | 176.9 |  |  |  |  |
| (B) Amine | | | | | | |
| (Triethylamine) | 7.2 | 7.2 |  | 7.2 | 7.2 | 7.2 |
| (Dimethylethanolamine) |  |  | 7.2 |  |  |  |
| (C) Aldehyde | | | | | | |
| (35% Aq Formaldehyde Soln) | 0.4 | 0.4 | 0.4 |  | 0.4 | 0.4 |
| (35% Aq Glyoxal Soln) |  |  |  | 0.4 |  |  |
| (D) Melamine Resin | | | | | | |
| (Sumimal M-8B) | 30.0 | 30.0 | 30.0 | 30.0 |  | 30.0 |
| (Cymel #238) *1 |  |  |  |  | 30.0 |  |
| (E) Acidic Compound (Catalyst 600) |  |  |  |  |  | 0.5 |
| Properties of the Bath | | | | | | |
| Dissolution in Acetone *2 | turb | turb | turb | turb | turb | turb |
| Particle Size (nm) *3 | 230 | 190 | 150 | 210 | 230 | 210 |
| Properties of the Coated Film | | | | | | |
| Baking Temperature (C.°) | 180 | 180 | 180 | 180 | 180 | 150 |
| Baking Time (minutes) | 30 | 30 | 30 | 30 | 30 | 30 |
| Film Thickness (μm) | 10 | 10 | 11 | 10 | 9 | 10 |
| External Appearance | good | good | good | good | good | good |
| Gloss (60° Mirror Reflectivity) | 28 | 30 | 35 | 29 | 27 | 28 |
| Pencil Hardness | 4H | 4H | 4H | 4H | 4H | 4H |
| Resist. to Boiling Water *4 | AR | AR | AR | AR | AR | AR |
| Adhesion (1 × 1 mm) | # | # | # | # | # | # |
| CASS Test (48 hrs) | 10.0 | 10.0 | 10.0 | 10.0 | 10.0 | 10.0 |
| Alkali Resistance (24 hrs) | 10.0 | 10.0 | 10.0 | 10.0 | 10.0 | 10.0 |

TABLE 2

|  | Comparative Examples | | | | | |
|---|---|---|---|---|---|---|
|  | 1 | 2 | 3 | 4 | 5 | 6 |
| Formulation (parts by weight) | | | | | | |
| (A) Anionic Acryl Resin | | | | | | |
| (a-1) |  | 176.2 | 176.2 | 176.2 | 176.2 | 176.2 |
| (a-3) | 176.2 |  |  |  |  |  |
| (B) Amine (Triethylamine) | 7.2 |  | 7.2 | 7.2 | 7.2 | 7.2 |
| (C) Aldehyde (35% Aq Formaldehyde Soln) | 0.4 | 0.4 |  | 0.4 | 0.4 | 0.4 |
| (D) Melamine Resin | | | | | | |
| (Sumimal M-8B) | 30.0 | 30.0 | 30.0 |  | 30.0 | 30.0 |
| (Nikalac MX-40) *5 |  |  |  | 30.0 |  |  |
| (E) Acidic Compound (Catalyst 296-9) *6 |  |  |  |  | 0.5 |  |
| Properties of the Bath | | | | | | |
| Dissolution in Acetone *2 | clar | ! | clar | turb | turb | turb |
| Particle Size (nm) *3 | 200 | ! | 210 | 170 | 230 | 220 |
| Properties of the Coated Film | | | | | | |
| Baking Temperature (C.°) | 180 | ! | 180 | 180 | 150 | 150 |
| Baking Time (minutes) | 30 | ! | 30 | 30 | 30 | 30 |
| Film Thickness (μm) | 10 | ! | 10 | 11 | 10 | 9 |
| External Appearance | good | ! | good | good | good | good |
| Gloss (60° Mirror Reflectivity) | 82 | ! | 76 | 45 | 29 | 28 |
| Pencil Hardness | 4H | ! | 4H | 4H | 2H | 3H |
| Resistance to Boiling Water *4 | AR | ! | AR | AR | AR | AR |
| Adhesion (1 × 1 mm) | # | ! | # | # | # | # |
| CASS Test (48 hrs) | 10.0 | ! | 10.0 | 10.0 | 9.5 | 9.8 |
| Alkali Resistance (24 hrs) | 10.0 | ! | 10.0 | 10.0 | 9.8 | 10.0 | turb: turbidity maintained
clar: became clear
AR: all right
: 100/100
!: Due to aggregation, an electrodeposition coating was not possible.
*1: Cymel #236 (manufactured by Mitsui Cytech KK) with a water dilutability of 2.4 cc
*2: Deionized water (6) and (7) was added in Examples 1 and 6, respectively and, after that, 100 g of acetone was added to 10 g of the sample and the changes in turbidity was checked by naked eye.
*3: Measured by an LPA-3000/3100 manufactured by Otsuka Denshi KK.
*4: External appearance of the coated film after allowing to stand at 98° C. for five hours.
*5: Nikalac MX-40 (manufactured by Sanwa Chemical KK) with a water dilutability of 4.7 cc.
*6: Catalyst 296-9 (manufactured by Mitsui Cytech KK) which is an acidic catalyst of a phosphate type with a pKa of more than 1.9.

MERIT OF THE INVENTION

In accordance with a composition of the present invention, fine gel particles which are transparent, do not deteriorate the metallic feel of the undercoat and form fine unevenness can be prepared in water which is essential in a common electrodeposition process without a compulsory and mechanical means for preparing the particles such as dispersing by means of sand mill or ball mill. In addition, when the electrodeposition coating is carried out using the composition of the present invention, said fine particles per se exhibit a good electrophoretic property and an excellent homogeneous dispersibility in an bath and, accordingly, it is possible to afford a matted electrodeposition coated film with uniform and good design.

What we claim is:

1. A matted electrodeposition coating composition which is characterized in containing (A) an anionic acryl resin having an acetoacetyl group in a side chain; (B) an amine and water; (C) an aldehyde; and (D) an alkoxylated methylolmelamine resin having a water dilutability of not more than 4.0 cc.

2. A matted electrodeposition coating composition which is characterized in containing (A) an anionic acryl resin having an acetoacetyl group in a side chain; (B) an amine and water; (C) an aldehyde; (D) an alkoxylated methylolmelamine resin having a water dilutability of not more than 4.0 cc; and (E) an acidic compound with pKa of not more than 1.9.

3. A method of producing a matted electrodeposition coating, characterized in that, the coated film is prepared using the composition of claim 1 by means of an electrodeposition coating method.

4. A method of producing a matted electrodeposition coating, characterized in that, the coated film is prepared using the composition of claim 2 by means of an electrodeposition coating method.

* * * * *